Feb. 17, 1925.

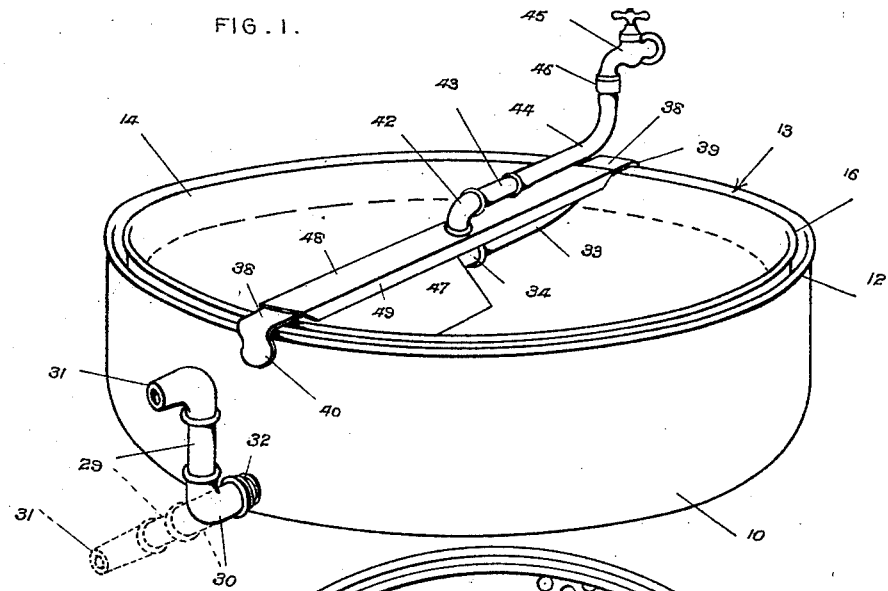

W. A. LENZ 1,526,603

PHOTOPRINT WASHER

Filed May 19, 1924

Inventor:
WILLIAM A. LENZ,

By Monroe C. Miller

Attorney.

Patented Feb. 17, 1925.

1,526,603

UNITED STATES PATENT OFFICE.

WILLIAM A. LENZ, OF ULSTER, PENNSYLVANIA.

PHOTOPRINT WASHER.

Application filed May 19, 1924. Serial No. 714,346.

*To all whom it may concern:*

Be it known that I, WILLIAM A. LENZ, a citizen of United States, residing at Ulster, in the county of Bradford and State of Pennsylvania, have invented certain new and useful Improvements in Photoprint Washers, of which the following is a specification, reference being had therein to the accompanying drawing.

The present invention relates to devices for washing and rinsing photographic prints, films, and the like, and is particularly an improvement over the photoprint washer disclosed in my Patent No. 1,313,395, granted August 19, 1919.

It is the object of the invention to improve the washer generally in its construction and details, to enhance the utility and efficiency thereof.

Among its more specific objects, the invention aims to provide novel means for delivering or spraying the water into the washer to obtain a thorough agitation and rinsing of the prints or other articles, depending flaps used with the spraying means for controlling the spray and to assist in the separation and agitation of the prints, novel means for supporting the spraying means and flaps so that they can be readily removed, a novel rotary basket in which the prints or other articles are contained and adapted to turn with the whirling motion of the water so as to avoid injurious frictional contact between the prints and parts of the washer against which they come into contact, novel means for mounting said basket for rotation in the tub or tank so that it is free to turn due to the whirling motion of the water created by the water sprayed into the basket, novel means for the discharge of the water from the tub or tank and for controlling or regulating the level of the water in the tub as well as enabling the water to be drained therefrom, and novel means for directing the water to the outlet so as to discharge the water as it dissolves the chemicals from the prints and to thereby keep the water fresh.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view of the improved washer.

Fig. 2 is a plan view thereof, a portion of the bridge being broken away.

Fig. 6 is an enlarged plan view of the outlet portion of the tub.

Figure 3:
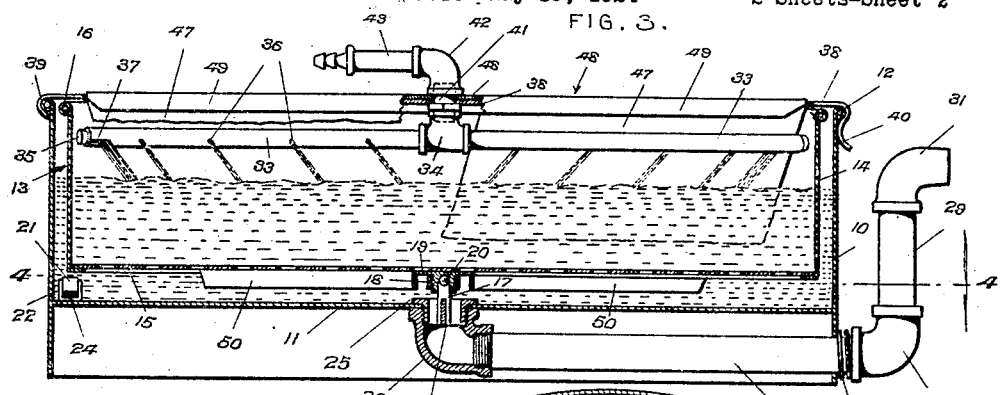
Fig. 3 is a vertical section on the line 3—3 of Fig. 2.
Figure 4:
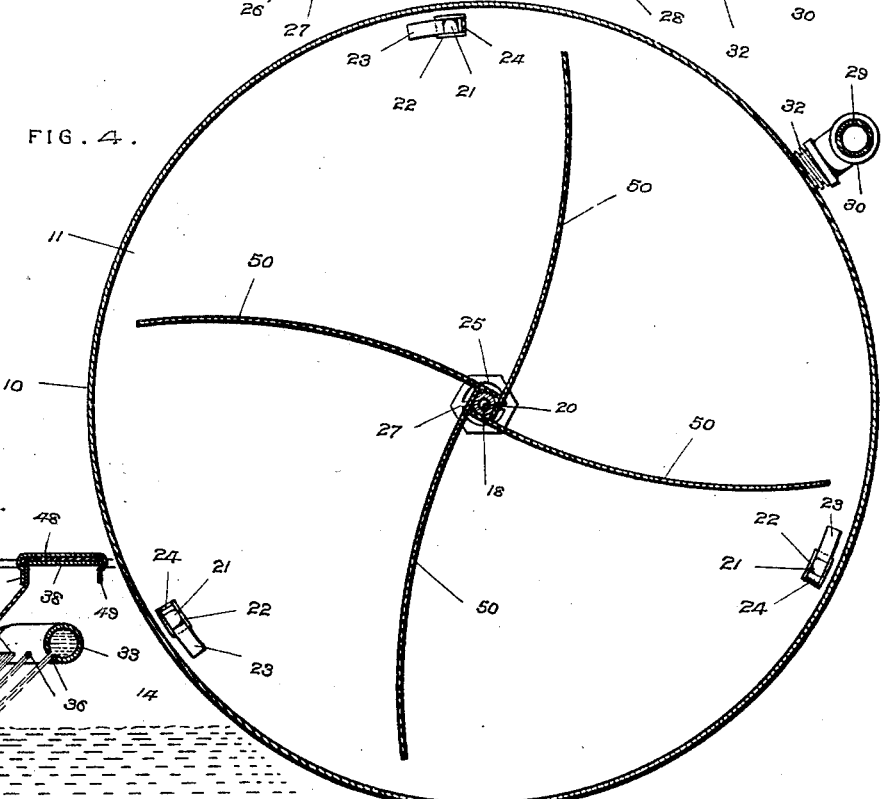
Fig. 4 is a horizontal section on the line 4—4 of Fig. 3.
Figure 5:
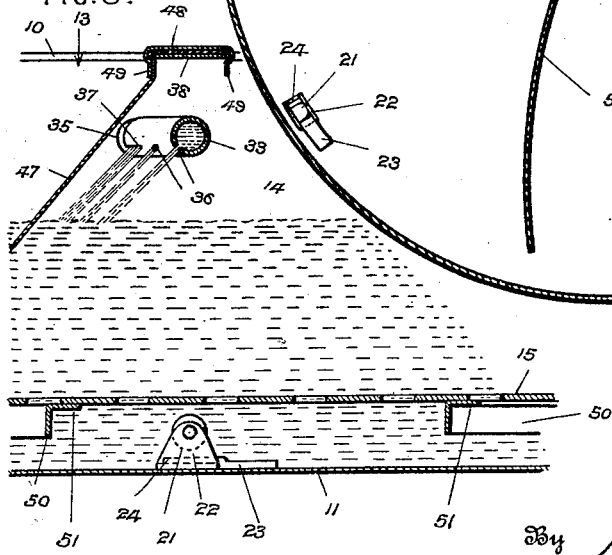
Fig. 5 is an enlarged vertical section on the line 5—5 of Fig. 2.

A tub or pan 10 of circular form and of any suitable size is provided which has the raised bottom 11 and the outstanding bead 12 at its rim, and a basket 13 of circular shape is disposed concentrically within the tub and is of slightly smaller diameter, to provide a suitable clearance between the walls of the tub and basket. This basket is made of smooth sheet metal, so as not to injure the prints, films or other sensitive articles while being washed. The circular wall 14 of the basket is composed of imperforate sheet metal, while the bottom 15 of the basket is perforated or apertured throughout. By using the sheet metal the inner surface of the basket is smooth, even though the bottom of the basket has the holes therein, thereby avoiding a rough surface such as would be presented by the use of wire mesh. The rim of the basket 13, or upper edge of the wall 14, is formed with an outstanding bead 16 so as to strengthen the basket.

The basket 13 is mounted in the tub for rotary motion, so as to turn with the water which has a whirling motion in the tub, as will hereinafter more fully appear. Thus, the basket is pivoted centrally of its bottom on the bottom of the tub by means of a step bearing including a pivot stud 17 rising from the bottom of the tub and a sleeve 18 depending from the bottom of the basket and fitted on said stud. As shown, a disk 19 is secured to the bottom 15 of the basket and has the sleeve 18 secured thereto, and, to reduce friction, a ball 20 can be seated on the stud 17 to contact with the disk 19 so that the basket will rotate freely.

In order to limit the tilting movement of the basket and prevent the wall of the basket from contacting with the wall of the tub, rollers 21 are supported from the bottom of the tub adjacent to the wall thereof and below the wall of the basket. These rollers 21 are mounted for rotation in U-shaped pedestals or supports 22 seated on the bottom of the tub and preferably removably held in place. Thus, strips 23 are soldered or otherwise secured on the bottom of the tub and have upwardly offset tongues 24 under which the pedestals 22 can be clipped, so as to be frictionally held in place by said tongues, yet permitting the pedestals and rollers to be removed when the basket is removed from the tub. The bottom of the basket is normally spaced above the rollers, so that the basket does not contact with the rollers when the basket is in horizontal position, but should the basket tilt in any direction it will come into contact with one or more of the rollers 21, which will limit the tilting movement of the basket without creating friction sufficiently to retard the rotation of the basket.

The water outlet is located centrally of the bottom of the tub, below the pivot bearing of the basket. The outlet opening is in a nipple 25 extending downwardly through the bottom of the tub and screw-threaded into an elbow 26 below the tub bottom, the nipple or member 25 being flanged to seat on the tub bottom, thereby clamping the nipple and elbow thereto. The nipple 25 has a cross bar 27 therein which supports the pivot stud 17. A radial pipe 28 is connected to the elbow 26 and extends outwardly through the wall of the tub below the tub bottom, said wall being extended below the tub bottom so as to support the tub bottom above the surface on which the washer is placed, thereby allowing clearance for the elbow 26 and pipe 28.

Means is provided in connection with the outlet for regulating the level of the water in the tub and basket, and for draining the water therefrom. Thus, a pipe or discharge member 29 is disposed at a right angle with the pipe 28, and is connected to the outer end of said pipe for turning movement about the horizontal axis of said pipe 28. The pipe 29 is secured in an elbow 30, which is screw-threaded on the outer terminal of the pipe 28 so as to permit the pipe 29 to be turned as stated. The pipe 29 has an elbow 31 on the free end thereof from which the water is discharged on a line parallel with the pipe 28. By turning the pipe 29 to upwardly extending position, the discharge passage or conduit forms a trap, so that the water in the tub will be at a level coinciding with the position of the elbow or discharge nozzle 31. By turning the pipe 29 so as to move the elbow 31 downwardly, the level of the water in the tub can be lowered, and it is thus possible to regulate the level of the water in the tub as may be desired, according to the number of prints being washed. Furthermore, by swinging the pipe 29 downwardly to bring the elbow 31 below the horizontal plane of the bottom of the tub and below the pipe 28, the water will be drained entirely from the tub. The pipe 29 is maintained in any of its angular positions by means of a coiled spring 32 surrounding the pipe 28 and confined between the elbow 30 and wall of the tub, thereby frictionally holding the elbow 30 against turning movement, but other suitable means can be used for this purpose.

The water spraying or delivering means comprises the spray pipes 33 extending in opposite directions, and connected at their adjacent ends to a T coupling 34, stoppers 35 being secured in the outer ends of said pipes. Said pipes have the discharge apertures 36 therein directed downwardly and inwardly, so that the jets of water discharged from the pipes are directed downwardly into the basket, and in opposite directions from the two pipes 33, in order that the water within the tub will be given a whirling motion. Furthermore, the water jets are directed inwardly in order to work the water and prints toward the center, and avoid them accumulating adjacent to the wall of the basket. At their outer ends, the pipes 33 have longitudinal slits 37 for discharging broad streams of water from the opposite terminals of the pipes adjacent to the wall of the basket. The streams discharging through the slits 37 are directed downwardly and inwardly at an angle similar to the other jets, and will create additional agitation of the water adjacent to the wall of the basket. The pipes 33 are curved so that their outer ends are bent slightly toward the direction in which the water moves, in order that the water discharged through the slits 37 will be directed substantially parallel with the wall of the basket.

The spray pipes 33 are supported within the mouth of the basket by a bridge 38 composed of a strip or bar spanning the tub. The bridge or bar 38 has one end bent into a hook 39 to engage the bead 12, and the opposite terminal of the bridge or bar is bent to form a snap hook 40 to also engage the bead. The bridge or bar 38 is positioned diametrically over the tub and the hook 39 is engaged with the bead, after which the hook 40 can be pressed down and snapped under the bead, thereby maintaining the bridge in position. A nipple 41 extends through the bridge 38 intermediate the ends thereof, and is screw-threaded into the coupling 34, and an elbow 42 is screw-threaded on said nipple, thereby clamping said parts together, and supporting the spray pipes 33 under the bridge. A nipple 43 is secured to the elbow 42 for the connection of a hose 44 through which the water is supplied from a faucet 45 or the like, the hose 44 having a coupling member 46 on the free end thereof to connect with the faucet or other water supply member.

Flaps or curtains 47, which may be of suitable fabric, rubber or other flexible material, are hung from the bridge 38 in front of the spray pipes 33 so as to dip or depend in the water, with the jets that discharge from the spray pipes directed toward the lower free edges of said flaps. Said flaps in depending in the water in front of the jets, will direct the water from the jets downwardly under the flaps, so as to deflect the prints toward the bottom of the basket when passing under said flaps. This will agitate the prints as well as keeping them separated. The upper edges of the flaps 47 bear on the bridge 38, and, in order to fasten the flaps on the bridge, a retainer strip or clasp 48 bears on the bridge 38 and has its edges 49 bent downwardly to snap under the edges of the bridge 38 and thereby clamp said flaps on said bridge, as well as strengthening the bridge. The two flaps 47 are at the opposite edges of the bridge 38, and the strip 48 is of shorter length than the bridge 38 so as not to extend to the walls of the basket and tub. The nipple 41 also extends through the strip 48, and by disconnecting the elbow 42 and coupling 34, the strip 48 can be removed from the bridge 38 for removing and replacing the flaps 47 conveniently.

The water at the bottom of the tub below the basket is directed inwardly toward the outlet, so as to keep the water in the basket and tub as fresh as possible. For this purpose, depending deflectors 50 are carried by the bottom of the basket, and have the flanges 51 at their upper edges soldered or otherwise secured to the basket bottom. Said deflectors are curved, with their concaved sides facing in the direction of rotation of the basket, in order that said deflectors will direct the water, which is between the bottoms of the tub and basket, inwardly toward the central outlet. Said deflectors are of slightly involute form, due to their longitudinal curvature, so as to direct the water inwardly.

In operation, the hose 44 is connected to the faucet or hydrant, and the water turned on so as to fill the tub or tank up to a level determined by the vertical position of the elbow or discharge terminal 31, and the water discharged from the elbow 31 can pass into a sink or other receiver. The prints or films or other articles to be washed are then placed in the water within the basket. The jets of water discharging from the spray pipes 33 downwardly and inwardly at an angle into the water in the basket, will set the water into whirling motion, and the velocity and agitation of the water is controlled by regulating the flow of water through the spray pipes. The prints are carried around with the water, and the whirling motion of the water will also rotate the basket with it, so that the water, prints and basket all rotate together. This will prevent the prints or negatives from being scratched or injured when contacting with the basket, inasmuch as the basket is moving at the same speed as the prints or negatives. The water being sprayed downwardly into the basket will also force the prints downwardly within the water in the basket as the prints pass under the spray pipes, and the agitation of the water will keep the prints separated. The flaps or curtains 47 will prevent excessive splashing of the water where the jets strike the water in the tub, as well as directing the water downwardly toward the bottom of the basket. The flaps will also direct the prints downwardly as they pass under the flaps. As a result, even though a large number of prints are being washed, they will be kept in motion and will be prevented from clinging together or accumulating at any portion of the basket. The prints are kept down in the water below the surface thereof by the jets discharging downwardly and the flaps 47, and the jets of water are also directed inwardly to prevent the prints from accumulating at the wall of the basket, inasmuch as the jets have a tendency to direct the prints toward the center, although they will not accumulate at the center of the basket. The fresh water is supplied from above diametrically across the basket, and due to the whirling motion of the water, the fresh water is thus distributed entirely over the surface of the water in the basket. The water flows downwardly in the basket to the perforated bottom thereof, so that there is a steady downward movement of the water, but same is not sufficiently rapid to carry the prints down against the bottom of the basket. From below the basket, the water flows inwardly to and through the outlet. The deflectors 50 will direct the water inwardly toward the outlet, so that the water adjacent to the wall of the tub, as well as the water at the center thereof, will be constantly moved toward and through the outlet. This avoids the accumulation of solution or chemicals washed from the prints at the wall of the tub, and there is a substantially uniform downward movement of the water in the basket from the center to the wall or rim thereof. In this way there is a constantly changing flow of fresh water through the basket and tube from the top to the bottom, during the whirling motion of the water and rotation of the tub. After the prints have been washed for a desired length of time, they are removed from the basket and dried, it being noted that the basket is open and accessible. Furthermore, the bridge 38 can be removed from the tub, which will also permit the basket to be lifted out of the tub. The parts of the washer can therefore be readily taken apart for cleaning or repairs, and the washer can be conveniently and economically manufactured. The basket in rotating with the washer and prints and being constructed of smooth sheet metal will not scratch or injure the sensitive surfaces of the prints or negatives, as would happen if the basket were made of wire mesh or if the prints or negatives were permitted to have moving contact with a stationary part, such as the tub or tank. It has been found in actual practice that with the present washer the prints are suspended within the water within the basket in an annular arrangement between the center and wall of the basket, and the prints, for the most part, assume an inclined position at about the angle that water is sprayed into the basket, with the prints spaced apart, and without the prints accumulating at the center or wall of the basket or at the surface of the water. The deflectors 50, in addition to directing the water inwardly toward the outlet, will also deflect the water upwardly through the holes in the bottom of the basket, to raise the prints from the bottom of the basket. This will overcome the tendency for the prints to settle on the bottom of the basket.

Having thus described the invention, what is claimed as new is:—

1. A washer comprising a tub, a basket rotatable in the tub, means pivotally mounting the basket in the tub, and rollers supported in the tub for the contact of the basket when it tilts from normal position.

2. A washer comprising a tub, a basket in the tub and pivoted centrally on the bottom of the tub for rotation, and roller supported by the tub under the bottom of the basket for the contact of the basket bottom to limit the tilting movement of the basket.

3. A washer comprising a tub, a basket rotatable in the tub, said tub having a central outlet, and means for delivering water downwardly at an angle into the basket for whirling the water in the tub and rotating the basket.

4. A washer comprising a tub, a basket rotatable in the tub, said tub having a central outlet, means for delivering water downwardly at an angle into the basket for whirling the water in the tub and rotating the basket, and means below the basket for directing the water inwardly toward said outlet.

5. A washer comprising a tub, a basket rotatable in the tub, said tub having a central outlet, means for delivering water downwardly at an angle into the basket for whirling the water in the tub and rotating the basket, and means carried by the bottom of the basket for directing the water inwardly toward said outlet.

6. A washer comprising a tub having a central outlet, a basket rotatable in said tub, means for delivering water downwardly at an angle into the basket for whirling the water in the tub and rotating the basket, and depending deflectors carried by the bottom of the basket for directing the water inwardly to said outlet.

7. A washer comprising a tub having a central outlet, a basket rotatable in the tub, means for delivering water into the tub for whirling the water therein and rotating the basket, and means below the basket for directing the water inwardly from the walls of the tub and basket to said outlet.

8. A washer comprising a tub having a central outlet, a basket rotatable in the tub, means for delivering water into the tub for whirling the water therein and rotating the basket, and depending deflectors carried by the bottom of the basket for directing the water inwardly from the walls of the tub and basket to said outlet.

9. A washer comprising a tub, means for spraying water at an angle downwardly into the tub for whirling the water in the tub, and a flexible flap depending in front of said means.

10. A washer comprising a tub, a spray pipe having apertures for directing jets of water downwardly at an angle into the tub for whirling the water in the tub, and a flap depending in front of said pipe to direct the water and articles in the tub downwardly under the flap.

11. A washer comprising a tub, a basket rotatable in the tub, means for spraying water downwardly at an angle into the basket for whirling the water in the tub and for rotating the basket, and a flap depending in front of the spraying means within the basket.

12. A washer comprising a tub, a bridge spanning and supported by the tub, water spray means carried by the bridge for directing water downwardly at an angle into the tub, and a flap depending from the bridge in front of said spraying means.

13. A washer comprising a tub, a bridge spanning and supported by the tub, a spray pipe below the bridge for directing water downwardly at an angle into the tub, a flap depending from the bridge in front of the spray pipe and having its upper edge portion overlapping the bridge, and a retainer strip on the bridge having its edge portions bent downwardly to snap under the edges of the bridge for clamping the flap on the bridge.

14. A washer comprising a tub, and a spray pipe having apertures for directing jets of water downwardly at an angle into the tub, said pipe having its outer terminal curved toward the direction in which the water is sprayed and provided with a slit for directing a stream of water downwardly and inwardly at an angle.

In testimony whereof I hereunto affix my signature.

WILLIAM A. LENZ.